United States Patent
Fisher et al.

Patent Number: 5,212,419
Date of Patent: May 18, 1993

[54] LIGHTWEIGHT HIGH POWER ELECTROMOTIVE DEVICE

[75] Inventors: Gene A. Fisher, Pinellas Park; John T. Jacobs, St. Petersburg, both of Fla.

[73] Assignee: Fisher Electric Motor Technology, Inc., St. Petersburg, Fla.

[21] Appl. No.: 820,287

[22] Filed: Jan. 10, 1992

[51] Int. Cl.$^5$ .............................................. H02K 1/12
[52] U.S. Cl. ........................................ 310/254; 310/216; 310/67 R; 310/256; 310/266
[58] Field of Search ............... 310/254, 12, 45, 67 R, 310/105, 266, 258, 269, 256, 218, 217, 156, 216

[56] References Cited

U.S. PATENT DOCUMENTS

| | | | |
|---|---|---|---|
| 295,368 | 3/1889 | Dennis . | |
| 464,026 | 12/1891 | Kammeyer . | |
| 497,001 | 5/1893 | Crompton . | |
| 1,227,185 | 5/1917 | Neuland . | |
| 2,792,511 | 5/1957 | Horstman . | |
| 3,014,139 | 12/1961 | Shildneck . | |
| 3,082,337 | 3/1963 | Horsley . | |
| 3,102,964 | 9/1963 | Bennett et al. . | |
| 3,128,402 | 4/1964 | Amick, Jr. . | |
| 3,134,037 | 5/1964 | Upton . | |
| 3,275,863 | 9/1966 | Fodor . | |
| 3,312,846 | 4/1967 | Henry-Baudot . | |
| 3,322,986 | 5/1967 | Benatti et al. . | |
| 3,538,364 | 11/1970 | Favereau | 310/158 |
| 3,602,749 | 8/1971 | Esters | 310/154 |
| 3,659,129 | 4/1972 | Pettersen | 310/216 |
| 3,663,850 | 5/1972 | Phelon | 310/153 |
| 3,729,642 | 4/1973 | Esters | 310/154 X |
| 3,845,338 | 10/1974 | Fawzy | 310/154 |
| 3,858,071 | 12/1974 | Griffing et al. | 310/266 |
| 4,114,057 | 9/1978 | Esters | 310/154 X |
| 4,128,364 | 12/1978 | Papst et al. | 310/91 X |
| 4,149,309 | 4/1979 | Mitsui | 310/42 X |
| 4,316,111 | 2/1982 | Merki et al. | 310/218 |
| 4,321,494 | 3/1982 | MacNab | 310/179 |
| 4,364,169 | 12/1982 | Kawano et al. | 310/216 X |
| 4,398,167 | 8/1983 | Dickie et al. | 310/266 X |
| 4,451,749 | 5/1984 | Kanayama | 310/62 |
| 4,501,980 | 2/1985 | Welburn | 310/266 X |
| 4,517,484 | 5/1985 | Dacier | 310/266 |
| 4,731,554 | 3/1988 | Hall et al. | 310/266 X |
| 4,734,606 | 3/1988 | Hajec | 310/90.5 |
| 4,900,965 | 2/1990 | Fisher | 310/266 X |
| 5,004,944 | 4/1991 | Fisher | 310/266 |
| 5,075,606 | 12/1991 | Lipman | 310/63 X |

Primary Examiner—Steven L. Stephan
Assistant Examiner—Ed To
Attorney, Agent, or Firm—Emch, Schaffer, Schaub & Porcello Co.

[57] ABSTRACT

An electromotive device is disclosed which utilizes stacks of oriented magnetic material as stator bars. Electrical conductors are wound about the stator bars to create a stator inductor. The stator bars are generally configured to shield the electrical conductor winding from electromagnetic forces and further, to provide a first flux return path for the magnetic flux created by magnets fixed to a rotor for movement with respect to the stator inductor.

16 Claims, 10 Drawing Sheets

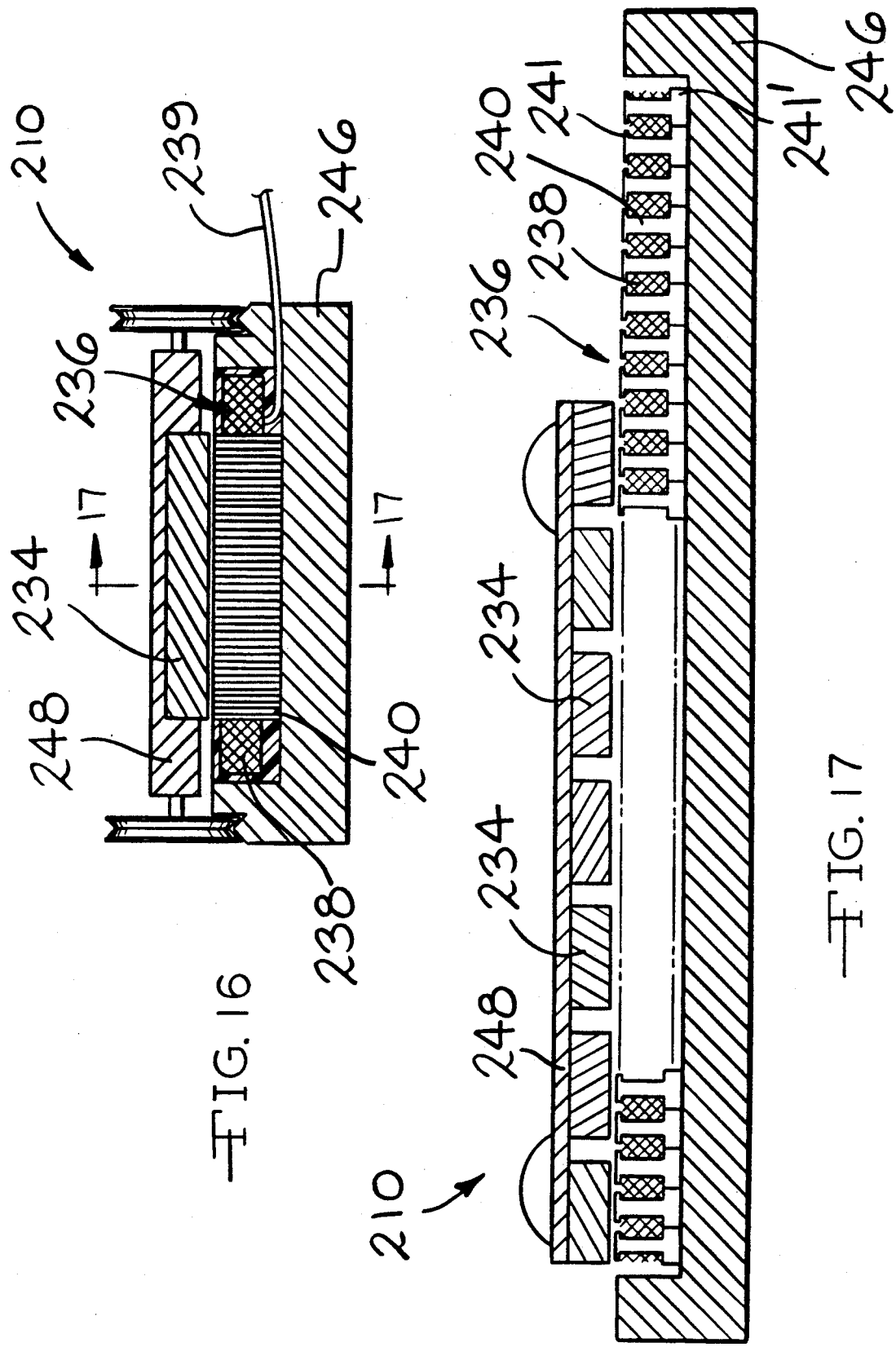

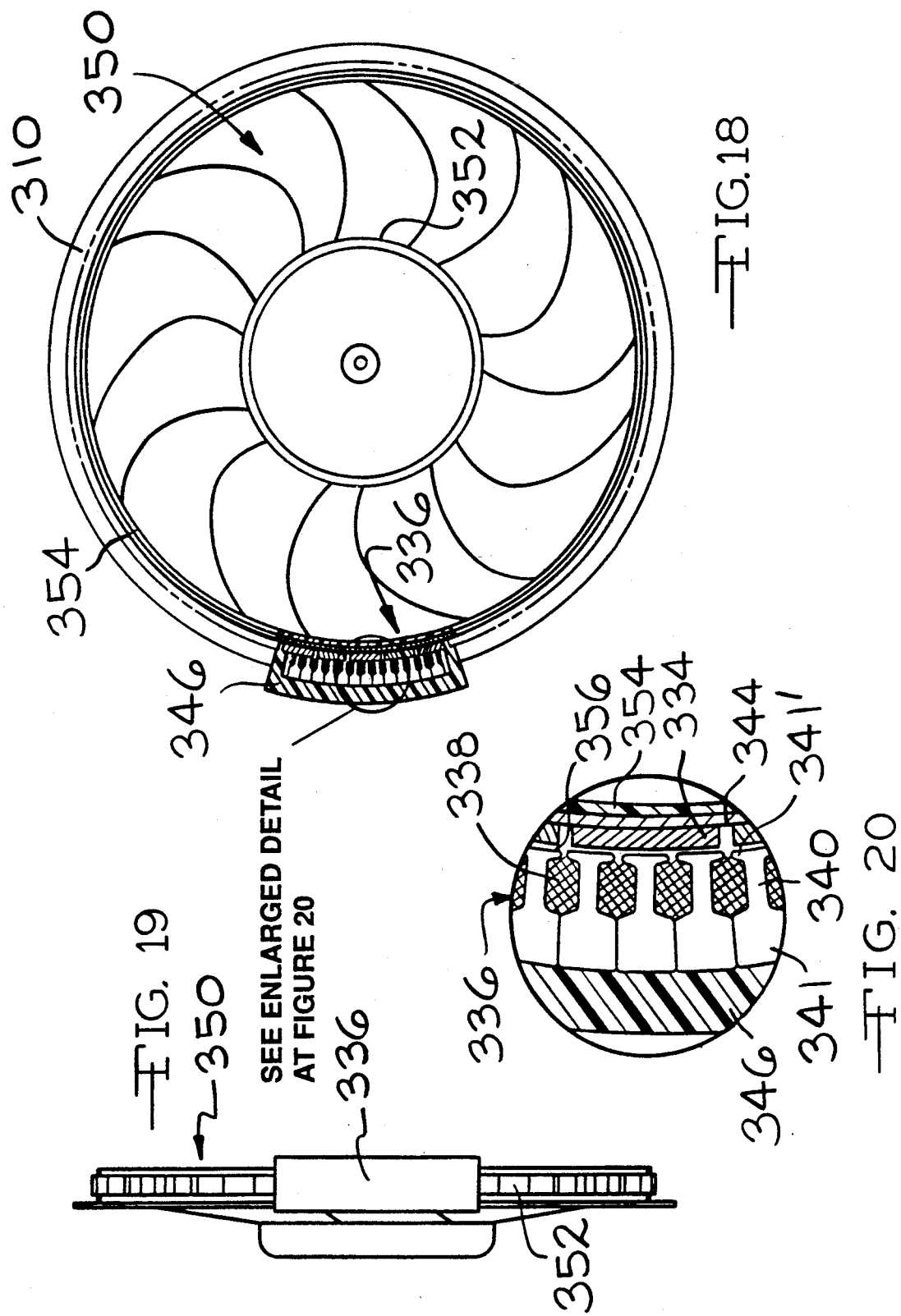

LIGHTWEIGHT HIGH POWER ELECTROMOTIVE DEVICE

BACKGROUND OF THE INVENTION

This invention relates to a high power-to-weight electromotive device capable of use as a motor, alternator or generator. Electromotive devices are known for use both in transforming electrical energy into mechanical power and transforming mechanical power into electrical energy. In both cases, the energy or power producing capability results from relative movement between a magnetic field and electrically conductive elements.

Lightweight motor, alternator and generator devices are well known and some are capable of operation at high speeds. However, many such devices are not capable of producing high power at high speeds. For example, high power density devices of 0.6 horsepower per pound of weight are known to be useful for periods of intermittent operation, but such devices are incapable of continuous operation at high power densities in excess of 1 horsepower per pound. Also prior high power electromotive devices have not been capable of simultaneous high speed and high torque operation, nor have they provided efficiency of operation.

Many of the problems associated with achieving a high power-to-weight ratio electromotive device have been addressed by U.S. Pat. No. 4,900,965. The '965 patent discloses an electromotive device with a high power density per unit weight effected by utilization of an armature assembly having a large diameter-fin cross section speculation ratio. This structure of the '965 patent results in low opposing induced currents, as well as low eddy currents, to enable operation of the electromotive device at high efficiency with maintainable high torque during high speed operation.

The '965 patent provides for minimal hysteresis or eddy current losses by providing a flux path through stationary iron. This design led to an improvement over conventional motors which suffer such eddy current losses due to the fact that the iron through which the flux path travels is moving. Since the torque of the motor is proportional to the flux, any reduction in the flux will result in decreased torque. In a typical electric motor, the torque will fall off rapidly with increasing speed. The eddy current losses in the copper conductors and armature bars are associated with the windings or copper and are caused by cross leakage between the bars (made worse by radially long bars) and direct exposure of the copper to the magnetic field, and over saturation of the armature bars due to an excess amount of permanent magnet material.

The '965 patent provides a device which minimizes those losses. Losses associated with bar to bar cross leakage are reduced by designing the '965 device to incorporate radially short armature bars. Losses induced by the copper being directly exposed to the magnetic field is solved by the '965 patent through the use of an I-shaped armature bar acting as a shield to the magnetic field. Finally, losses caused by oversaturation of the armature bars are solved by the '965 patent by designing the amount of permanent magnet material such that the bars just approach saturation. The design of the '965 device, however, necessitates that the flux travel through at least four air gaps, a design which has led to problems as a result of air gap reluctance. It has been found that to maintain useful flux density in spite of the air gap reluctance, the magnets must be thickened radially. However, such a modification enlarges the diameter of the motor, increases the weight of the motor, and increases the cost of the motor, all of which are contrary to the desire to have a lightweight motor. Since the torque levels of the motor are proportional to the amount of useful flux, less useful flux will result in reduced motor torque and higher current draw at higher speeds for the motor. Therefore, it is still an objective to design a high powered, lightweight motor having high torque levels and increased useful flux.

Another high power-to-weight ratio electromotive device has been addressed by a dispersed conductor electromagnetic device which is the subject of U.S. Pat. No. 5,004,944. The '944 design utilizes a straight-sided armature bar of powdered iron which allows full exposure of the copper windings to the magnetic field. The powdered iron does not have the flux-carrying ability that other embodiments such as silicone iron does. To minimize the eddy current effect, the '944 patent utilizes extremely fine wire with its windings. The armature bars are fabricated from powdered iron to maximize the amount of flux traveling through what would otherwise be a very large air gap.

The '944 approach has been proven undesirable in terms of power-in versus power-out due to the resistance characteristics of the fine wire. This resistance characteristic causes significant energy losses in the form of heat at higher operating levels which translates into lost power and efficiency. In addition, the straight-sided armature bars do not easily lend themselves to standard production automatic winding techniques as the coils tend to slip outward from between the bars. Thus, other winding techniques must be utilized.

The power loss in the '944 patent due to fine wire resistance is again compensated for by increasing the amount of permanent magnet material beyond the saturation level of the iron bars. Aside from the costs of additional material, however, the bulk of this additional flux goes to the copper winding in the form of eddy current loss and is dispersed, leaving very little gain in power for the additional material investment.

While the preceding and other various arrangements have been designed with the objective of achieving a high power-to-weight ratio electromotive device, they have not been completely successful.

Thus, it is primary objective of this invention to provide an electromotive device which achieves a high power-to-weight ratio by dispersing the electromotive windings to minimize eddy currents within the coils.

It is a further object of this invention to provide an electromotive device which achieves a high power-to-weight ratio by dispersing the electromagnetic field core pieces to minimize eddy currents.

It is a still further objective of this invention to provide an electromotive device which achieves a high power-to-weight ratio by dispersing the electromotive windings to minimize eddy currents within the coils and dispersing the electromagnetic field core pieces to minimize eddy currents generally.

It is another objective of this invention to provide an electromotive device which achieves a high power-to-weight ratio by shielding the electromotive windings with field core piece extensions to minimize eddy current within the coils.

It is still another object of this invention to provide an improved electromotive device capable of use as a highly efficient motor, alternator, or generator.

It is still another object of this invention to provide an improved electromotive device that is capable of continuous operation at high power densities in excess of one horsepower per pound.

It is still another object of this invention to provide an improved electromotive device having an optimum thickness armature assembly which represents a balance among the effects of heat transfer to the cooling medium, heat production from resistance heating and other sources, and torque production.

It is still another object of this invention to provide an electromotive device of simple design having an integrated flux return path.

It is still another object of this invention to build an electromotive device having the maximum flux in the iron cores and incorporating a built-in return path in these cores, thus eliminating the need for a separate return path.

A final object of this invention is to use the core stators having integral flux return paths in curvilinear sections up to 360° to drive, without limitation, devices such as rim mounted magnets on fans, propellers and impellers.

The foregoing and other objectives will become apparent to one skilled in the art as the description proceeds. The invention resides in the novel construction, combination and arrangement of parts substantially as described and illustrated in the specification and drawings of this patent application, and more particularly as defined by the appended claims. It is understood that changes in the precise embodiments of the disclosed invention are meant to be included as within the scope of the claims. The description of the preferred embodiment is intended to be illustrative and is not intended to be limiting upon the scope of the claims.

SUMMARY OF THE INVENTION

This invention provides an improved electromotive device using oriented magnetic material to improve performance and reduce size and weight of the device. The design utilizes stacks of oriented stator bars of magnetic material generally formed in the shape of a I wherein the top cross bar of the I is of a thickened design. Alternatively, the oriented stator bar material may be produced with the lower cross bar of the I thickened in design. The stator bar is oriented to provide the maximum permeability along the long axis, thereby allowing the maximum flux to be carried by the minimum amount of material. Thus, the motors or alternators of the present invention are more efficient, lighter and less expensive. In the present invention, the stator inductor, which is a combination of the magnetic stator bars complete with copper windings, is relatively thin and provides for cooling on both sides thereby allowing more power to be drawn from the device. The magnetic flux field is confined to the magnetic material, thereby minimizing the number of air gaps and, as a result, decreasing the iron eddy currents in the copper windings.

The individual stator bars which make up the stator inductor are, preferably, manufactured in a stamping process. The cross section of the stator bars are designed to be as wide as practical to take advantage of the permeability of the oriented material. Variations using the design of the present invention can include more than three phases. The phases may also be individually driven with, for instance, an H-bridge.

Since this invention includes the flux return path in the material of the magnetic stator bar, the need for a separate high tolerance laminated flux return path is eliminated. By eliminating the high tolerance laminated flux return path and its concomitant air gaps, the present invention has reduced the costliness of production of the electromotive device and has eliminated the need for high tolerance manufacturing of the parts to meet the high tolerance air gap requirements between the magnetic stators and the separate return path. Finally, the use of the magnetic stator as the flux return path reduces the air gap flux reluctance which negatively affects the motor torque.

BRIEF DESCRIPTION OF THE DRAWINGS

FIG. 16 is an end view of still another alternative embodiment of the electromotive device of this invention illustrating a flat linear implementation thereof;

FIG. 17 is a sectional view taken along line 17—17 of FIG. 16;

FIG. 18 is a top view of a thin rim drive motor utilizing the electromotive device of the present invention;

FIG. 19 is a side view of the thin rim drive motor of FIG. 18; and,

FIG. 20 is an enlarged view of section 20 of FIG. 18.

DESCRIPTION OF THE PREFERRED EMBODIMENT

This invention relates to all electric motors, alternators and generators where a magnetic flux path is defined by a magnetic material. It is particularly useful, but not limited to, devices having circular symmetry, and works very well in brushless motor designs. More alternatively, it can be useful in linear and curvilinear motors, as well as circular motors.

The invention provides a high power density (1 to 5 horsepower per pound) electromotive device. In a typical electromotor, torque falls off rapidly with increasing motor speed. This is primarily due to opposing induced currents or eddy current losses in the copper conductors and armature bars. These losses are minimized by this invention and torque is thereby maintained at continuous operations at high speeds.

Figure 1:
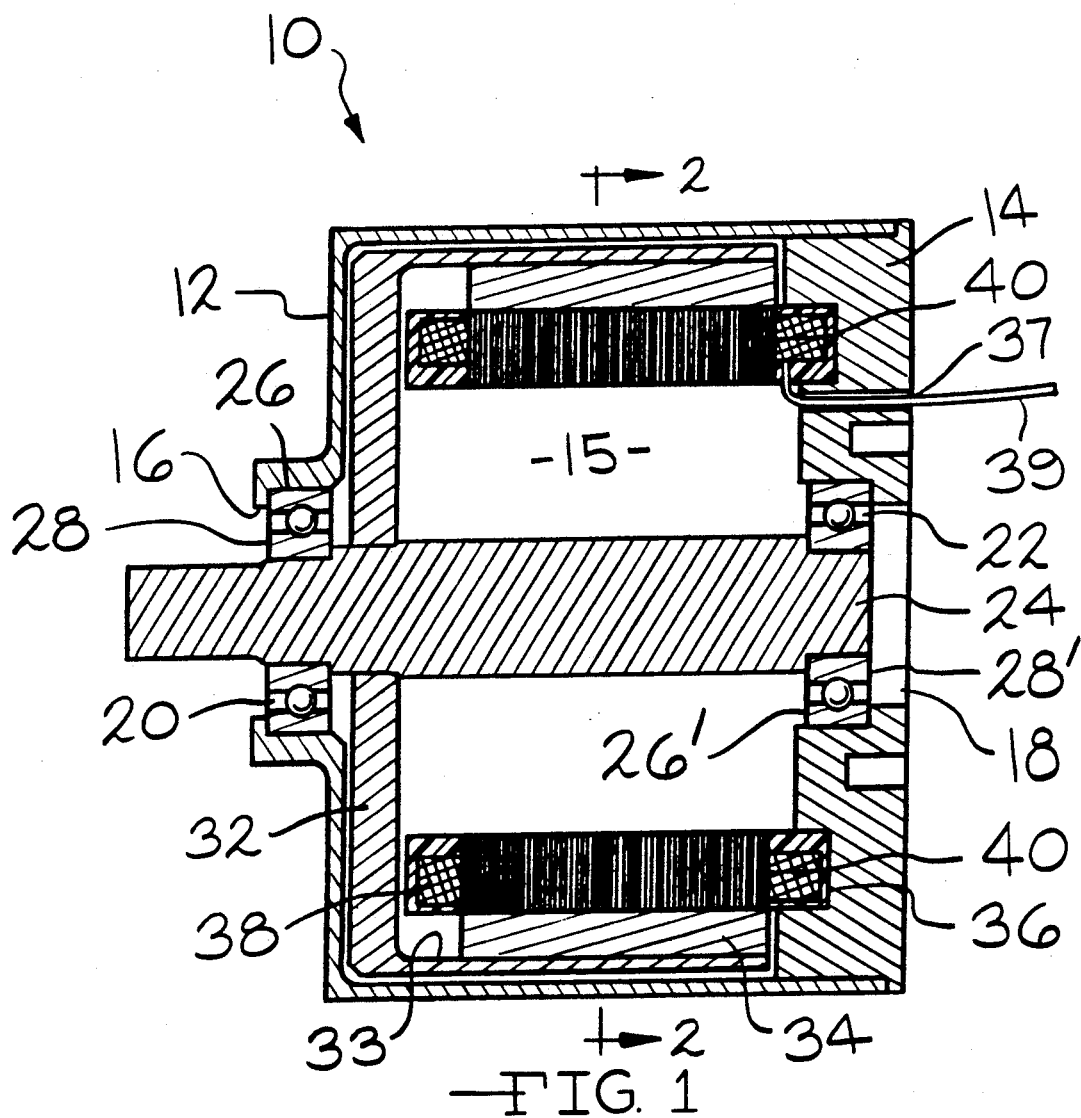
FIG. 1 is a side sectional view of a rotary implementation of the electromotive device of this invention.
Figure 2:
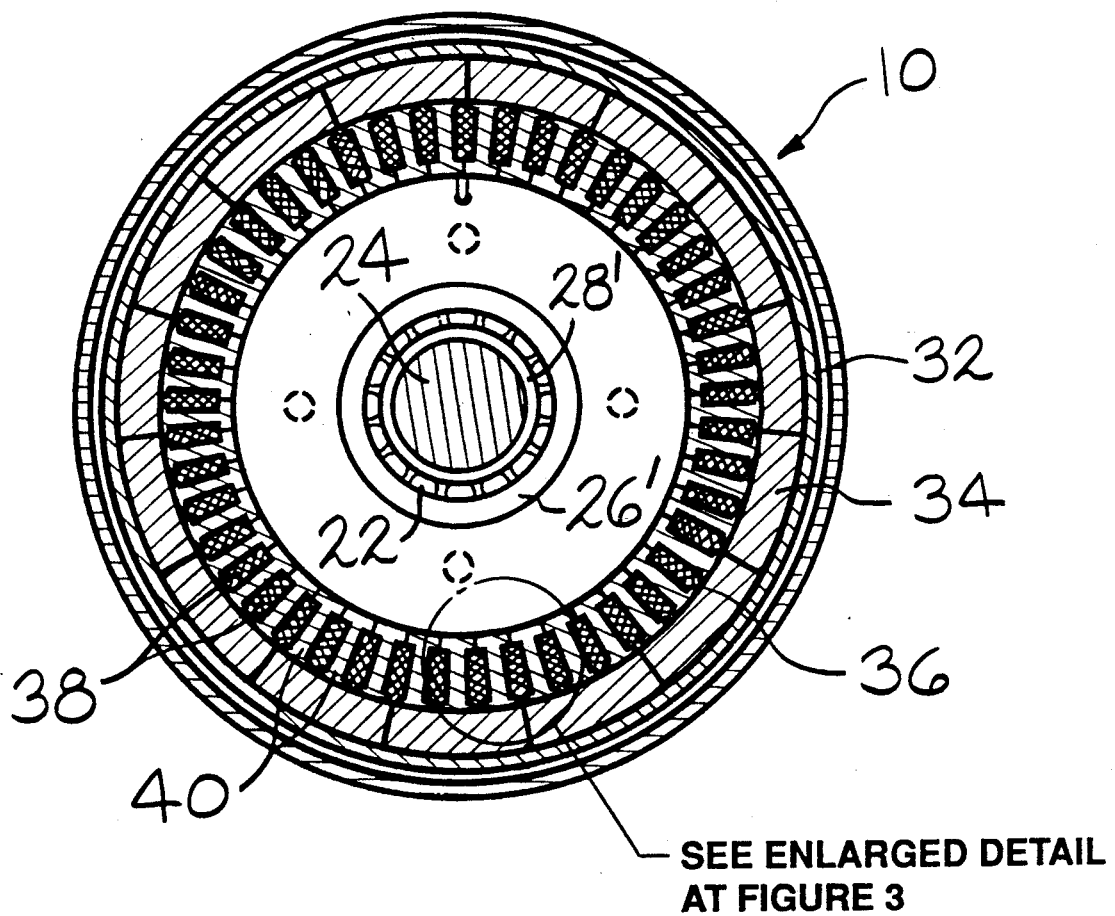
FIG. 2 is a sectional view taken along line 2—2 of FIG. 1.
Figure 3:
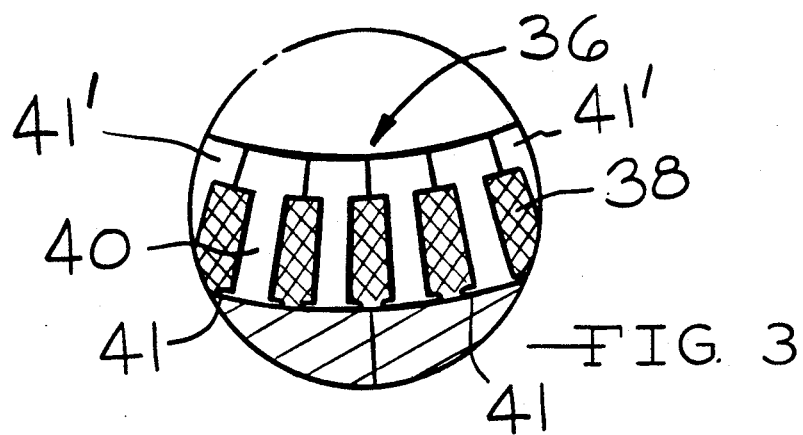
FIG. 3 is an enlarged view of section 3 of FIG. 2.

Referring now to FIGS. 1, 2 and 3, an electromotive device having circular symmetry is shown as having an outer cylindrical housing 10. The housing 10 is preferably integrally formed with a first end plate 12 and includes a second end plate 14 secured to the opposed end of the housing 10 to create an enclosed hollow cylinder 15. It should be noted that it is perfectly acceptable to form the housing 10 with separate units or end plates 12, 14, if desired. Each end plate 12, 14 includes an aperture 16, 18, respectively, concentrically formed about the axially centerline of the cylindrical housing 10. Each aperture 16, 18 includes a set of bearing members 20, 22 designed to retain a motor shaft 24 in position for rotation about the axial centerline. The bearing members 20, 22 each include an outer race 26, 26' fixed to the first end plate 12 and second end plate 14, respectively. The inner race 28, 28' is fixed to the shaft member 24 in cooperative relationship with the outer races 26, 26'. Ball members 30, 30' are positioned between the inner races 28, 28' and outer race 26, 26'.

The rotor 32 is a cup-shaped member 34 fixed to the shaft 24 at a position proximate the first end plate 12 and extending in a concentric spaced relationship with the first end plate 12 and outer housing 10. A plurality of magnets 34 are fixed to the inside surface 33 of the rotor 32. In the exemplary embodiment, the magnets 34 are permanent magnets preferably formed of neodymium boron iron (Nd Fe B), but they may also be formed of barium ferrite ceramic (BaFe ceramic), samarium cobalt (SmCo), or the like. Permanent magnets are used in the illustrative exemplary embodiment, but they can also be replaced with electromagnets.

The stator inductor 36 is fixed with respect to the housing 10. The stator inductor 36 is mounted within the second end plate 14 and is spaced concentrically around the centerline axis of the shaft 24. The rotor 32 rotates about the center axis causing the magnets 34 to rotate around the stator inductor 36 in a spaced relationship, preferably a gap of 20 to 30 thousandths of an inch. The stator inductor 36 includes electrical conductors or wires 38 which are wound between the stator bars 40. The electrical conductors 38 are preferably a bundle of relatively large diameter insulated copper wires wound into a linking pattern, with the opposite end of the wire bundles connected to connectors 39 which extend through an aperture 37 located in the second end plate 14. The use of dispersed, large diameter windings for the electrical conductor 38 enables the resultant electromotive device to achieve a high power-to-weight ratio because more actual copper can be distributed into any given space. Preferably the electrical conductors 38 are formed into a bundle throughout the stator inductor 36, with each turn of the bundled windings having a flux carrying element or stator bar 40 located therebetween. Variations of typical windings are schematically represented in FIGS. 2, 9, 10, 11, 13 and 14.

The stator bars 40 are flux carrying elements preferably formed from a lamination of a plurality of silicone iron sheets. FIG. 12 is illustrative of one embodiment of a single layer or sheet of a laminated stator bar 40. The extensions 41 at the four corners give the bar 40 a beam cross sectional configuration with an enlarged thickened cross section at 41'. The extensions 41, 41' provide increased surface area for cooling, as well as enhanced flux shielding for the windings 38. Shielding the electrical conductor windings 38 from the magnetic fields within the motor minimizes eddy currents within the coils and assists in achieving a high power-to-weight ratio. This and the increased cooling heat exchange surface allows for higher current flow which increases field strength without increasing eddy currents in the windings. The magnetic flux return path variously illustrated in FIGS. 9, 10 and 11 extends through the thickened extensions 41' of the stator bar 40 and follows through the magnets 34 into the inside surface 33 of the rotor 32.

Referring again to FIG. 12, a single stator bar is illustrated with the grain direction or orientation within the metal forming the bar 40 controlled to be along the long axis. This orientation allows for maximum permeability or maximum flux to be carried by a minimum amount of iron, thereby providing a lighter motor with more room for windings 38. Since the grain direction is parallel to the primary flux path through the stator bar 40 heat generation is reduced because the level of resistance to the magnetic flux is reduced. By comparison, a standard stator having a random grain pattern provides maximum resistance which leads to maximum heat generation. Thus, a grain pattern following the direction of flux minimizes resistance and heating. The controlled grain inductor bar or stator bar 40 construction as shown in FIG. 12 allows higher flux densities without increased heating, thereby increasing the efficiency of the device.

Figure 4:
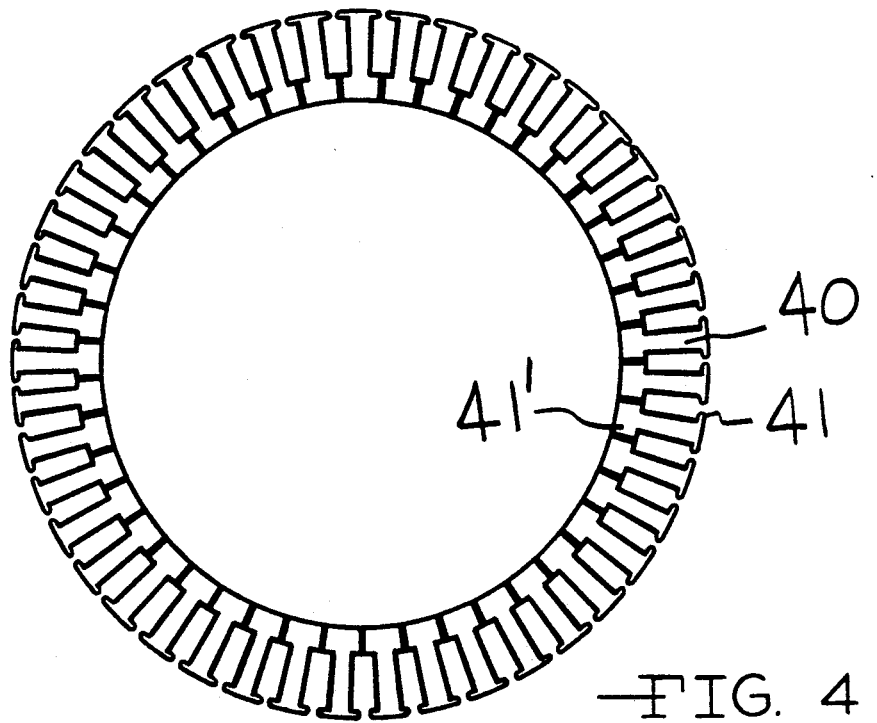
FIG. 4 is an elevated view of a stator core manufactured for use in a rotary implementation of the present invention.
Figure 5:
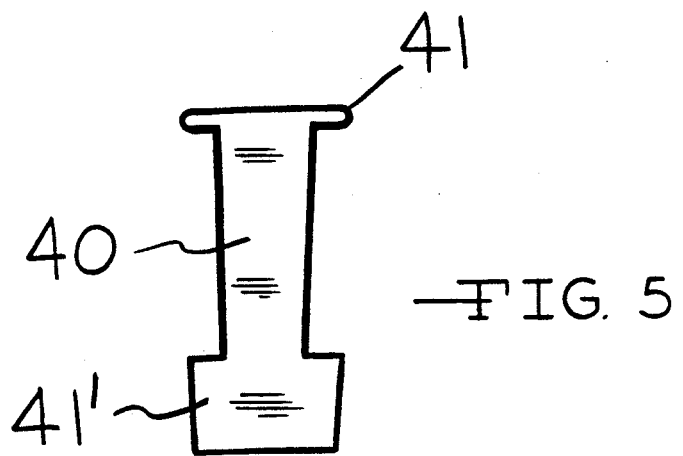
FIG. 5 is a detailed view of a single stator bar as utilized in FIG. 4.
Figure 9:
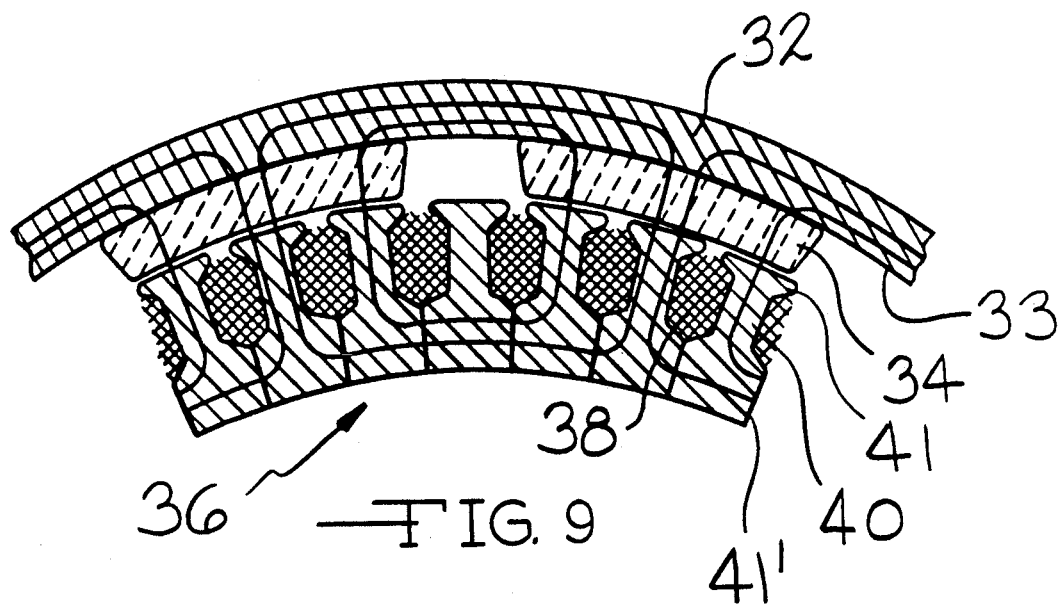
FIG. 9 is a partial cut away view illustrating the flux return path of the invention as utilized in a rotary electromotive device of this invention.

Referring now to FIGS. 4, 5 and 9, a first embodiment of a combination of stator inductor 36 intended for use with the rotary electromotive device of FIG. 1 is shown. Each stator bar 40 of the inductor 36 is shown with extensions on its outside radial perimeter 41 and thickened extensions on its inside radial perimeter 41'. The stator bars 40 are layered with the number of layers being designed in accordance with the desired amount of power. For instance, layering the stator bars 40 to a 6/10th of an inch depth will provide an approximate horsepower of 10 and layering the stator bars to 1.2 inches will provide a 20 horsepower electromotive device. Referring to FIG. 9, the flux paths for an electromotive device designed with stator bars 40 such as those illustrated in FIGS. 4 and 5 are shown.

Figure 6:
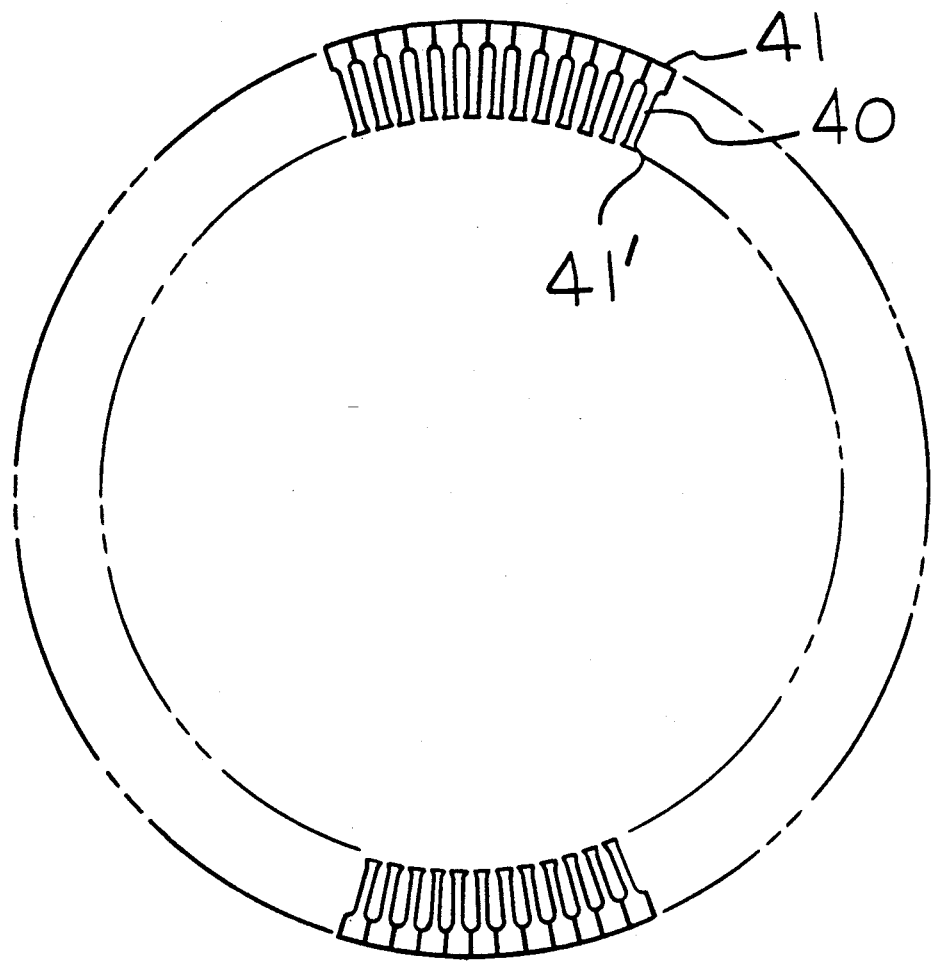
FIG. 6 is an elevated view of an alternative embodiment of a stator core manufactured for use in a rotary implementation of the present invention.
Figure 7:
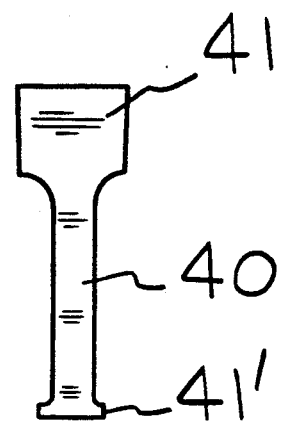
FIG. 7 is a detailed view of a single stator bar as utilized in FIG. 6.
Figure 10:
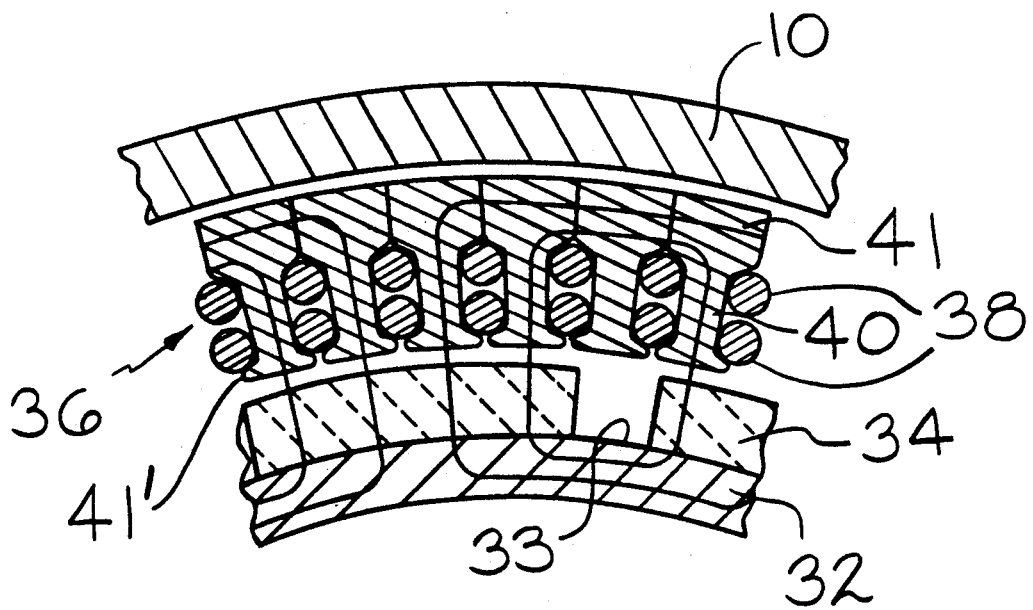
FIG. 10 is a partial cut away view illustrating the flux return path of an alternative embodiment of the invention as utilized in a rotary electromotive device of this invention.

Referring now to FIGS. 6, 7 and 10, an alternative embodiment of the stator inductor 36 is shown wherein the extension 41 on the outside radius of each stator bar 40 is of the thickened cross section and the extension 41' on the inner radius of the stator bar is of the narrow cross section. Again, the stator bars 40 are designed to be layered to provide desired amounts of power. An electromotive device utilizing a stator inductor 36 configuration of this type will be provided with the rotor 32 and magnets 34 on the inside radius of the stator inductor 36, as shown in FIG. 10. Referring to FIG. 10, the flux path of such an alternative embodiment of the electromotive device is illustrated.

Figure 8:
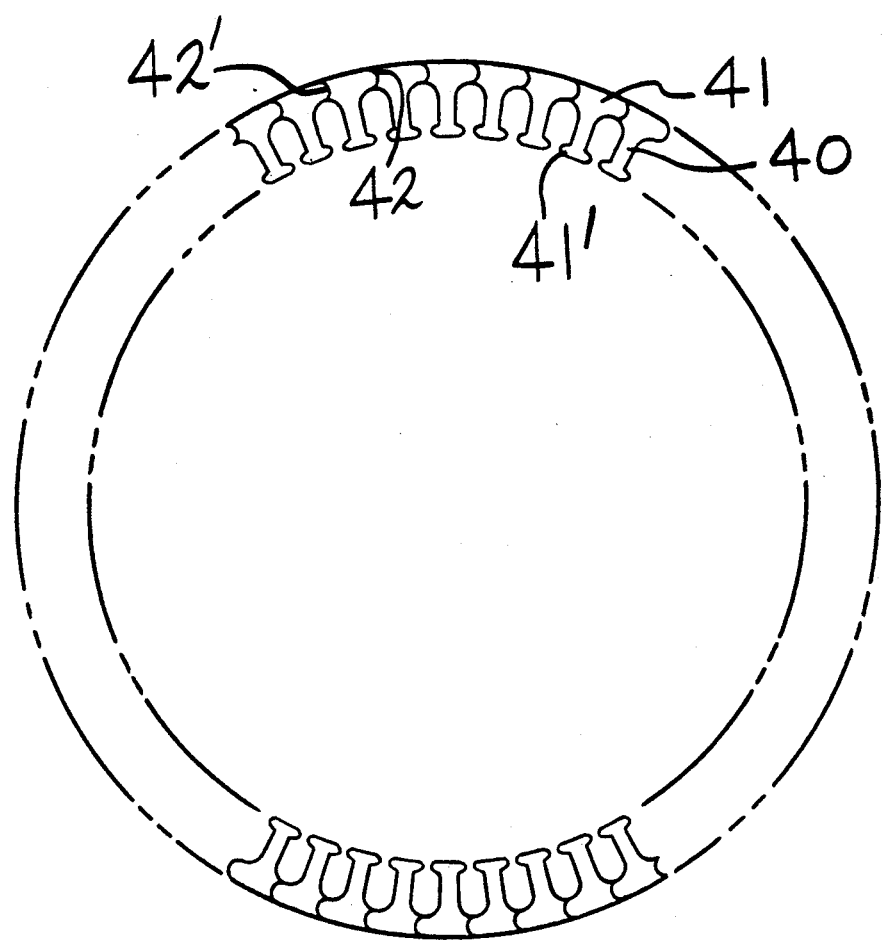
FIG. 8 is an elevated view of yet another alternative embodiment of a stator core manufactured for use in a rotary implementation of the present invention.
Figure 8A:
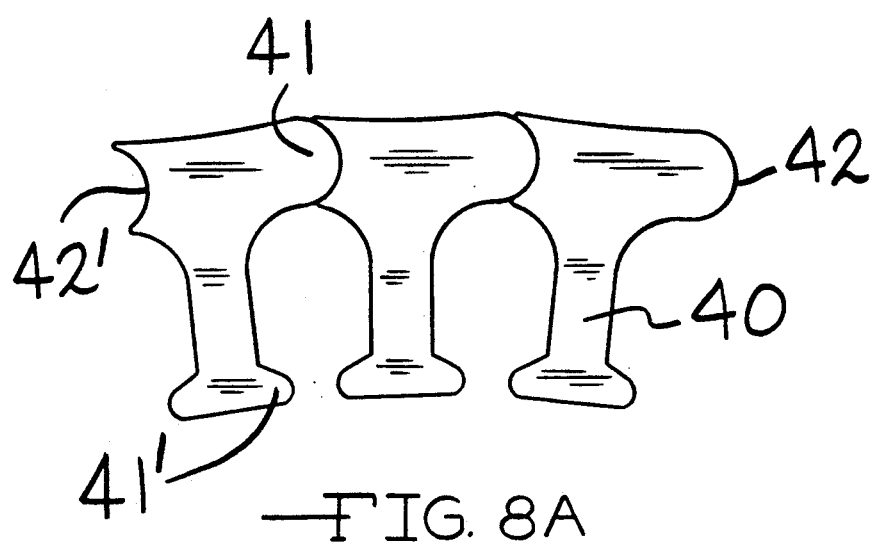
FIG. 8A is an detailed view of three stator bar units as utilized in FIG. 8.

Referring now to FIGS. 8 and 8A, yet another alternative embodiment designed for the stator inductor 36 is shown. The stator bars 40 have the thickened cross section at the outer radial extension 41 and the thinner cross section at the inner radial extension 41'. Such a stator bar design is used with a rotor 32 carrying magnets 34 proximate the inner radial thinner cross sections 41'. The thicker cross section 41 is provided with a curved arc mating surface 42, 42'. The mating surface 42, 42' combination of the stator bar 40 allows for a universal stamping of the stator bar 40 to be used in forming stator inductors 36 of different radial sizes. Of course, it is envisioned that this embodiment of the stator bar 40 may also be utilized with stators having the thickened cross-section at the inner radial extension 41'.

Figure 11:
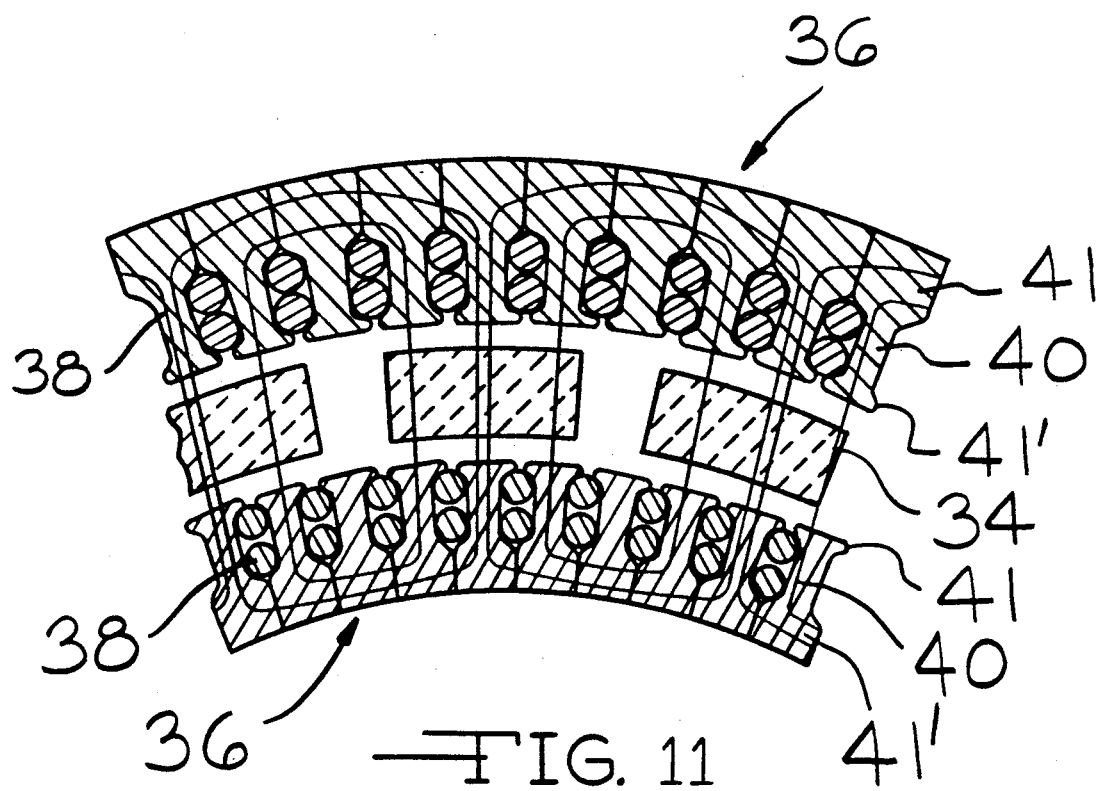
FIG. 11 is a partial cut away view illustrating still another alternative embodiment of the use of two distinct embodiments of stator inductors in a stacked combination with a rotary electromotive device of this invention.
Figure 12:
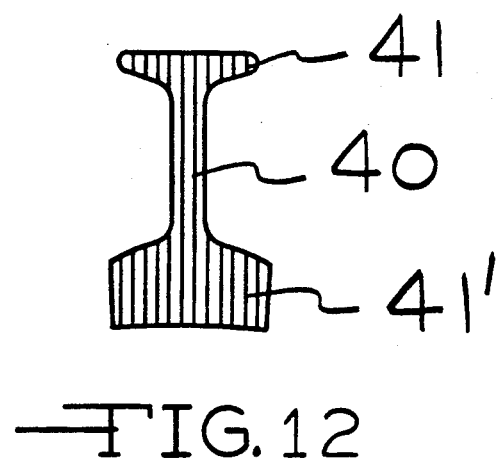
FIG. 12 is a view of a single lamination stamping of an oriented grain ferrous metal which, when laminated in mass creates a stator bar.

Referring now to FIG. 11, yet another alternative embodiment of an electromotive device of the present invention is shown utilizing both designs of stator inductors 36. The magnets 34 are sandwiched between layers of stator inductors 36 wherein the thickened cross-sections of the sets of stator bars 40 are positioned in spaced relationship from the magnets 34. Such stacking of the varied types of stator inductors 36 will provide for enhanced power. The two cylindrical stator inductors 36 can be configured by placing additional layers of stator inductor elements radially inwardly or outwardly as shown to increase power.

Figure 13:
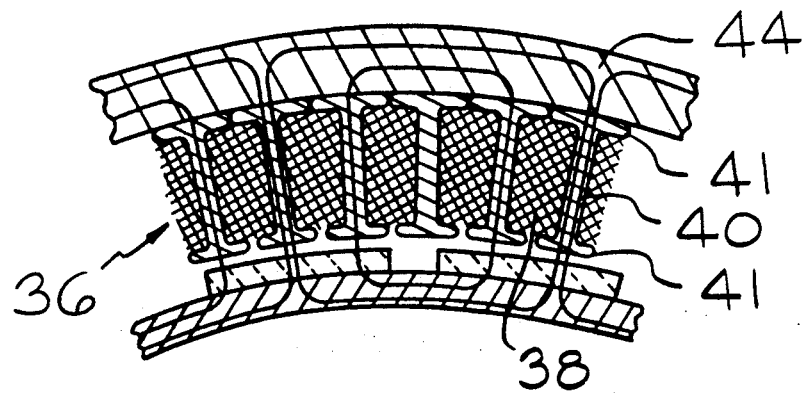
FIG. 13 is a partial cut away view showing yet another alternative embodiment of the present invention.

Referring now to FIG. 13 yet another alternative embodiment of the stator inductor 36 of the present invention is shown. Formation of the thickened cross section of a stator bar 40 is formed by utilizing standard I-bars 43 having equal cross sectional extensions 41 on all four corners and adhering a thickened flux return member 44 to the outer radial surface or the inner radial surface of the I bar 43, depending on design.

Figure 14:
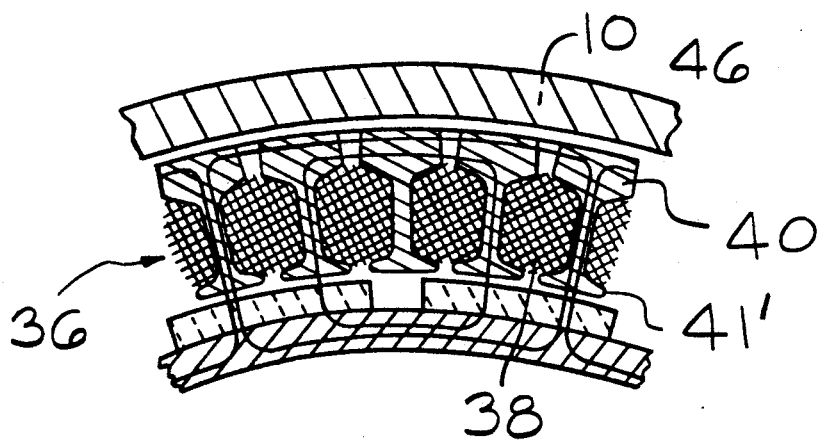
FIG. 14 is a partial cut away view showing yet another embodiment of the present invention.

Referring now to FIG. 14, there is schematically shown a detail view of an alternative design for positioning of the stator bars 40 with respect to each other. In most embodiments shown in the drawings, the stator bars 40 are positioned extremely closely to each other when forming the stator inductor 36. If the stator bars 40 are positioned with an air gap 46 between each stator bar 40 will effect the inductance of the coils. The smaller the air gap 46 the larger the inductance. Since the inductance controls the speed with which the electrical conductor coil 38 receives current, which in turn affects the torque level of the motor upon startup, controlling the inductance through the air gap between the stator bars 40 will therefore affect the rate with which the motor torque will be provided.

Figure 15:
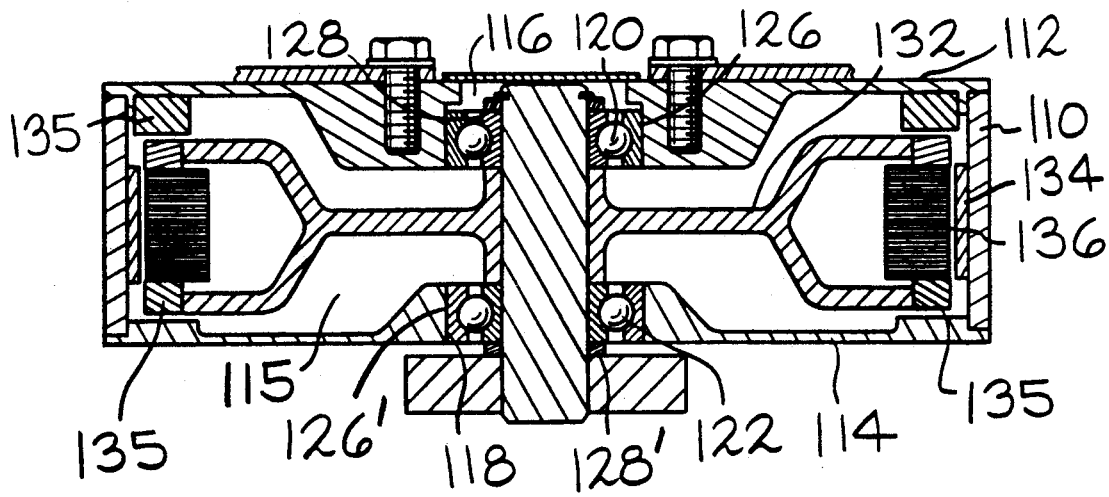
FIG. 15 is a side sectional view of an alternative embodiment of the electromotive device of the present invention, illustrating an alternative structure for the stator inductor.

Referring now to FIG. 15, an alternative embodiment of an electromotive device of the present invention is shown. The electromotive device is again of circular configuration. It includes an outer housing 100 having a first end plate 112 and a second end plate 114 affixed to the housing 100 to create an enclosed hollow cylinder 115. A first aperture 116 and second aperture 118 are located on the axial centerline of the first end plate 112 and second end plate 114, respectively. Each aperture 116, 118 carries a first bearing member 120 and a second bearing member 122. The shaft member 124 is positioned for rotation in the bearing members 120, 122 to rotate on the axial centerline. The outer housing 100 carries a plurality of magnets 134 permanently fixed thereto. As in the embodiments previously discussed, the magnets 134 may be of the permanent variety or may be electromagnets. The rotor 132 is fixed to the shaft member 124 and carries a stator inductor 136 composed of stacked stator bars 140 wound with electrical conductors 138. In this embodiment, the stator inductor 136 with electrical conductor windings 138 is rotationally movable by the rotor 132 with respect to the magnets 134, which are fixed in position on the housing 100. Slip rings (not shown) provide the necessary power to the stator inductor 136. The stator inductor 136 is carried at both ends 135 by the rotor 132 to eliminate any cantilever effect on the stator inductor 136. Such a cantilever effect can sometimes deleteriously affect the operation of an electromotive device due to fluctuations and interference with the minimal air gap between the magnets 134 and the stator inductor 136.

Referring now to FIGS. 16 and 17, the present invention is shown as utilized with a linear motor of the type used to drive typewriter carriages and weaving shuttles. The linear motor 210 includes a linearly oriented stator inductor 236. The stator bars 240 which make up the inductors 236 are similar to those shown in FIGS. 4 and 5. The stator bars 240 are arranged linearly and are retained in a potting 246. A carriage member 248 carrying a plurality of magnets 234 is positioned on the potting 246 for linear movement with respect to the stator inductor 236. As in the previously discussed embodiments, the stator bars 240 are wound with copper electrical conductors 238 to form the stator inductor 236. The linear motor 210 is operated by supplying current to the electrical conductors 238 and then pulsing the current to propel the moving carriage 248 horizontally in both directions.

Referring now to FIGS. 18, 19 and 20, the present invention is shown in an embodiment intended to be utilized with a fan rim drive motor 350. Fan rim drive motors are generally designed for use in instances where a low thickness profile is required and a motor drive mounted on the axis of the fan is undesirable. A typical application of a fan rim drive motor is used with a motorized vehicle. Rather than mounting the motor drive for the fan on the axis of the fan the motor is instead mounted to the housing 310 of the fan 352. The stator inductor 336 is contained in a stator potting 346 which is fixed to the housing 310 of the fan 352. The stator inductor 336 is composed of stator bars 340 is wound with electrical conductors 338. The rim 354 of the fan 352 which is spaced with an appropriate gap 356 from the stator inductor 336 includes the plurality of magnets 334. The magnets are fixed to a flux return path 344 which in turn is fixed to the rim 354 of the fan 352. Current which is pulsed through the windings 338 of the stator inductor 336 will provide movement to the fan 352 as a result of the flux movement through the stator inductor 336, magnets 334, and flux return path 344.

In most all embodiments utilizing the present invention, the stator bars are individually stamped and stacked. The stacks of stator bars are fastened or held together by any acceptable adhesive such as tape or glue, prior to receiving the windings of the electrical conductors. If the stator bars are to be utilized with curvilinear motors they are fastened together using tooling designed as a specific circular magnetic winding fixture. Once the stack of stator bars are in place in the tooling, the coils of the electrical conductors are wound around the stator bars to form the stator inductor. A potting fixture is then attached to the winding fixture. The stator inductor is then potted in an epoxy-type resin. Potting is achieved either through vacuum impregnation, dipping, brushing or centrifugal application, or which ever method best meets the specific design requirements. After application of the epoxy-type resin temperatures are elevated to cure the resin by elevating the temperatures around the potted stator inductor or bonding the coils and cores within a heat sink at one end.

While preferred embodiments of this invention have been illustrated and described, variations and modifications may be apparent to those skilled in the art. Therefore, the above written disclosure of the preferred embodiments of this invention are not intended to be limiting upon the scope and breadth of the invention. Rather, the scope and breadth of the invention should be determined from the claims which follow.

We claim:

1. An electromotive device comprising, in combination:
   a stator inductor composed of a plurality of magnetic flux conducting stator bars, said stator bars each having a longitudinal grain orientation, and an electrical conductor disposed as randomly dispersed windings around said plurality of stator bars for creating an electromagnetic field;
   means adjacent said inductor for generating a magnetic field within said electromotive device;
   said stator bars being of a geometry wherein said windings are shielded from such magnetic field within said electromotive device and for providing a first flux return path for substantially all of the flux, said flux return path being generally perpendicular to such grain orientation through said stator bar; and
   a second flux return path proximate said magnetic field generating means.

2. The electromotive device of claim 1, wherein said stator bars are generally of an I configuration having a neck portion with opposed cross-bars, generally perpendicular to the longitudinal orientation of said neck portion, integral with said neck portion, whereby the cross bar of said I configuration proximate said magnetic field generating means is of a narrow cross section and the remaining cross bar spaced from said magnetic field generating means and opposed to said first cross bar is of a generally thick cross section to provide said first flux return path.

3. The electromotive device of claim 2, wherein said stator inductor is fixed with respect to a housing enclosing said electromotive device and said magnetic field generating means includes a plurality of magnets fixed to a rotor positioned proximate said stator inductor for rotation about an axis central to said rotor and said stator inductor.

4. The electromotive device of claim 3, wherein said magnetic field generating means includes a plurality of permanent magnets fixed to said rotor.

5. The electromotive device of claim 3, wherein said magnetic field generating means includes a plurality of electromagnets fixed to said rotor.

6. The electromotive device of claim 2, wherein adjacent stator bars are contiguous at their thick cross sectional cross bar.

7. The electromotive device of claim 2, wherein said adjacent stator bars are spaced a specific distance from each other at the thick cross sectional cross bar to create an air gap inductance level in such electromotive device.

8. The electromotive device of claim 2, wherein said stator bars have arcuate engagement surfaces on the thick cross sectional cross bar, such arcuate engagement surface for providing stator inductors of differing diameters while utilizing a single stator bar of universal shape.

9. The electromotive device of claim 1, wherein said stator bars are of an I shaped geometry having a neck portion with opposed cross bars, generally perpendicular to the longitudinal orientation of said neck portion, integral with said neck portion and further include a flux return member fixed to the cross bar positioned in opposition to said magnetic field generating means.

10. The electromotive device of claim 1, wherein said stator inductor is fixed to a rotor about an axial centerline and said magnetic field generating means is positioned proximate said stator inductor about such same centerline wherein said stator inductor and rotor rotate with respect to said magnetic field generating means.

11. The electromotive device of claim 10, wherein said magnetic field generating means includes a plurality of permanent magnets fixed to said housing.

12. The electromotive device of claim 10, wherein said magnetic field generating means includes a plurality of electromagnets fixed to said housing.

13. The electromotive device of claim 2, wherein said stator inductor is linear and said magnetic field generating means is positioned proximate said linear stator inductor and further including means for moving said magnetic field generating means with respect to said stator inductor.

14. An electromotive device comprising, In combination:
   a first stator inductor composed of a first set of magnetic flux conducting stator bars, each of said first set of stator bars having a longitudinal grain orientation, and a first electrical conductor disposed as randomly dispersed windings around said first set of stator bars for creating an electromagnetic field;
   means adjacent said first stator inductor for generating a magnetic field within said electromotive device;
   a second stator inductor composed of a second set of magnetic flux conducting stator bars, each of said second set of stator bars having a longitudinal grain orientation, and a second electrical conductor disposed as randomly dispersed windings around said second set of stator bars for creating a second electromagnetic field, said second stator inductor being positioned in opposed relationship with said first stator inductor wherein said magnetic field generating means is positioned therebetween;
   said first and second stator inductors having respective stator bars of a geometry wherein said respective windings from such magnetic field within said electromotive device and for providing a first flux return path and a second flux return path for substantially all of the flux, said first and second flux return paths being generally perpendicular to such respective grain orientations through each respective set of stator bars.

15. An electromotive device comprising, in combination, a fan assembly having a stator inductor composed of a plurality of magnetic flux conducting stator bars with an electrical conductor disposed as randomly dispersed windings around said plurality of stator bars for creating an electromagnetic field positioned on a housing member encompassing a fan member; means for generating a magnetic field positioned on said fan member in a position proximate said stator inductor; said stator bars being of a geometry wherein said windings are shielded from said magnetic field within said electromotive device and for providing a first flux return path through said stator bars; and a second flux return path positioned on said fan member proximate said magnetic field generating means.

16. An electromotive device comprising, in combination:

a fan assembly having a stator inductor composed of a plurality of magnetic flux conducting stator bars, said stator bars each having a longitudinal grain orientation, and an electrical conductor disposed as randomly dispersed windings around said plurality of stator bars for creating an electromagnetic field, said stator inductor being positioned on a housing member encompassing a fan member;

means for generating a magnetic field within said electromotive device positioned on said fan member in a position proximate to said stator inductor; said stator bars being of a geometry wherein said windings are shielded from such magnetic field within said electromotive device and for providing a first flux return path for substantially all of the flux, said flux return path being generally perpendicular to such grain orientation through said stator bars; and a second flux return path positioned on said fan member proximate said magnetic field generating means.

* * * * *